Sept. 9, 1941.  A. C. BLANEY  2,255,644

SOUND FILM PRINTING

Filed Aug. 5, 1939

Inventor

ARTHUR C. BLANEY,

By  Vel R. Goshaw

Attorney

Patented Sept. 9, 1941

2,255,644

UNITED STATES PATENT OFFICE 2,255,644

SOUND FILM PRINTING

Arthur C. Blaney, Los Angeles, Calif., assignor to Radio Corporation of America, a corporation of Delaware Application August 5, 1939, Serial No. 288,612

4 Claims. (Cl. 95—75)

This invention relates to the printing of sound motion picture film and particularly to a method of and means for testing the condition and operation of motion picture sound film printers.

It is well known that in the production of sound motion picture film that sound is recorded along a narrow strip adjacent the sprocket holes of the film. The record thus made is usually a negative from which is printed both separate prints and prints having concomitant pictures. Several types of printers are commonly used for printing motion picture sound film, the usual type being contact printers wherein the negative and positive print stock are run in contact with one another at the point of light impression or translation point. The films are held in contact either by means of a pressure gate along which the films slide, or on a comparatively large-diameter toothed or toothless sprocket having a roller or rollers which bear upon the films as they pass over the sprocket. The films may be light impressed at a fixed aperture in the pressure gate or as they pass over the sprocket, the latter being the usual practice.

It is realised that if during this printing process the films should move with respect to one another at the translation point, distortion will be produced in the final print. Also, because the sound track is immediately adjacent one row of sprocket holes, it is necessary to maintain perfect film contact along this edge of the respective films to avoid sprocket tooth modulation. The present invention, therefore, is directed to a method of and means for checking the uniformity of film contact during operation of the printer. Thus, any defect or maladjustment may be readily detected to avoid reprints, which are time-consuming and costly. The invention provides both a visual and audible testing and checking system for printers as well as an improved test negative.

The principal object of the invention, therefore, is to facilitate the testing of a motion picture film printer.

Another object of the invention is to readily determine the uniformity of film contact made between a negative film and positive film in a film printer.

A further object of the invention is to provide a film test negative which will provide both a visual and an audible check on the uniformity of film contact in a motion picture printer.

Figure 1:
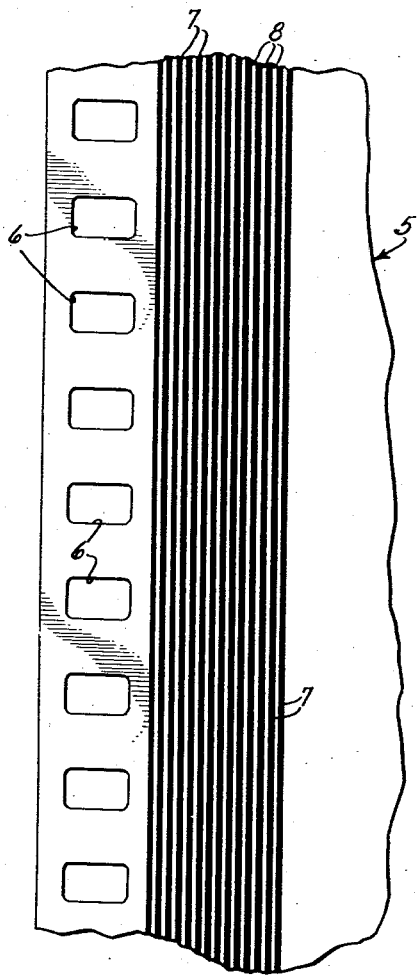
Figure 2:
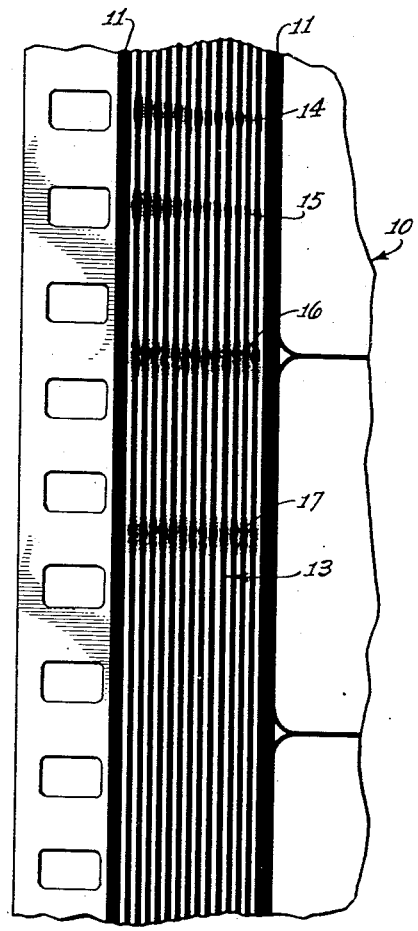

Although the novel features which are believed to be characteristic of this invention are pointed out with particularity in the claims appended herewith, the manner of its organization and the mode of its operation will be better understood by referring to the following description read in conjunction with the accompanying drawing forming a part thereof in which Fig. 1 is a partial view of the negative test film of the invention; and Fig. 2 is a positive print made from the negative of Fig. 1 illustrating the appearance of certain defects of adjustment in a printer.

Referring to the drawing, a partial negative film 5 is shown with one row of perforations 6 and a plurality of parallel opaque lines 7 and transparent spaces 8 in the usual sound track area. The width of the lines and spaces is not particularly important as long as they are small enough for image spread or process distortion to be an appreciable part of their width, this type of distortion being described in a copending application of Glenn L. Dimmick, Serial No. 76,901, filed April 29, 1936. The actual number of lines and spaces, however, should not be less than twenty-five each for a 100 mil. width track area. The negative is made by direct recording wherein a plurality of aligned apertures are employed spaced closely together so as to project a plurality of light beams upon the film across the track, this, of course, corresponding to 100% modulation of the sound track area.

Referring now to Fig. 2 showing a print 10 made from the negative of Fig. 1, it is to be observed that the sound track area is bound by wide opaque lines 11 and a series of parallel opaque lines and transparent spaces intermediate the areas 11 complementary to the lines and spaces of the negative 5. If the print appears as shown below the point 13, then the printer has operated satisfactorily. However, should areas 14 and 15 appear in the print, it is evidence of sprocket tooth modulation and lack of proper contact of the films adjacent the perforations, which sometimes occurs when the translation point is on the sprocket. It is to be observed that the lines opposite the sprocket holes are spread out and fuzzy, the spreading effect tapering away from the holes. This distortion, of course, can be seen with the naked eye and particularly under a microscope and is, of course, audible when the film is run through a reproducer. The fact that the distortion is both visible and audible is an important feature of this type of test film, the print producing no sound if the printer has operated perfectly.

Another type of distortion is shown in the areas 16 and 17, this type generally being due to slippage of the negative with respect to the positive raw stock or any lack of contact between the two films at the translation point. Usually the negative film has shrunk somewhat in processing, and when it is run in contact with a strip of raw stock, slippage sometimes occurs in jumps instead of being gradually spread over the entire length of the film. Should this slippage occur at the point of light impression, fuzzy points such as shown at 16 and 17 are the result. Should the film twist at the translation point, the fuzzy areas do not always extend entirely across the sound track.

The invention, therefore, is particularly useful for the testing of motion picture sound printers just before a large amount of film is to be run therethrough by simply running the test negative through the printer then developing and inspecting the print. Test negatives having lines and spaces transversely of the film as well as other configurations have been tried, but the present test negative is the preferred form.

I claim as my invention:

1. A negative film for testing the printing of sound track comprising a negative having a plurality of opaque parallel lines equally spaced from each other extending longitudinally and disposed within the sound track area of said negative, the width of said lines being approximately the size of the average variations between opaque and transparent areas on the sound negatives to be printed by said printer.

2. A negative test film in accordance with claim 1 in which the width of said lines for testing a variable area sound track printer is two mils.

3. The method of testing the adjustment of a motion picture printer comprising providing a light sensitive film to be printed, providing a test film having closely spaced longitudinally arranged opaque lines in the sound track area, and light impressing said sensitive film with the test film by passing them through said printer in contact to provide a record on the impressed film that exhibits the character of any out-of-adjustment condition of said printer by the type of blurring pattern of the lines on the impressed film.

4. The method in accordance with claim 3 in which the width of said lines is approximately 2 mils.

ARTHUR C. BLANEY.